(12) United States Patent
Holroyd et al.

(10) Patent No.: US 9,371,914 B2
(45) Date of Patent: Jun. 21, 2016

(54) PRESSURIZED FLUID CYLINDERS

(75) Inventors: Nigel John Henry Holroyd, Riverside, CA (US); Francis Xavier Kay, Buckinghamshire (GB)

(73) Assignee: LUXFER GAS CYLINDERS LIMITED, Salford (GB)

( * ) Notice: Subject to any disclaimer, the term of this patent is extended or adjusted under 35 U.S.C. 154(b) by 279 days.

(21) Appl. No.: 11/722,255

(22) PCT Filed: Dec. 21, 2005

(86) PCT No.: PCT/GB2005/050256
§ 371 (c)(1),
(2), (4) Date: Feb. 26, 2008

(87) PCT Pub. No.: WO2006/067527
PCT Pub. Date: Jun. 29, 2006

(65) Prior Publication Data
US 2009/0266816 A1    Oct. 29, 2009

(51) Int. Cl.
*F17C 13/06* (2006.01)
*F16K 1/30* (2006.01)
*F17C 13/04* (2006.01)

(52) U.S. Cl.
CPC ............. *F16K 1/303* (2013.01); *F16K 1/306* (2013.01); *F16K 1/308* (2013.01); *F17C 13/04* (2013.01); *F17C 2201/0109* (2013.01); *F17C 2201/0114* (2013.01); *F17C 2201/032* (2013.01); *F17C 2201/056* (2013.01); *F17C 2201/058* (2013.01); *F17C 2203/0619* (2013.01); *F17C 2203/0646* (2013.01); *F17C 2203/0663* (2013.01); *F17C 2205/0169* (2013.01); *F17C 2205/0308* (2013.01); *F17C 2205/0323* (2013.01); *F17C 2223/0123* (2013.01); *F17C 2223/036* (2013.01); *F17C 2227/048* (2013.01); *F17C 2250/0636* (2013.01); *F17C 2260/011* (2013.01)

(58) Field of Classification Search
USPC ............... 220/203.01, 581, 582, 566, 565; 222/494, 496; 251/339
See application file for complete search history.

(56) References Cited

U.S. PATENT DOCUMENTS

| 3,243,083 | A | 3/1966 | Reynolds et al. |
| 3,419,180 | A * | 12/1968 | Homrig et al. ............... 220/235 |
| 3,930,517 | A | 1/1976 | Gagala |
| 4,077,422 | A | 3/1978 | Brinkley et al. |
| 4,907,617 | A | 3/1990 | Whalen |
| 5,144,973 | A | 9/1992 | Green et al. |
| 5,894,859 | A | 4/1999 | Pavlicek |
| 5,971,356 | A * | 10/1999 | Offenwanger et al. .. 251/129.07 |
| 6,230,737 | B1 | 5/2001 | Notaro et al. |
| 2003/0066836 | A1* | 4/2003 | Sakaguchi et al. ............ 220/581 |

(Continued)

FOREIGN PATENT DOCUMENTS

| GB | 2298026 A | 8/1996 |
| JP | 49134317 U | 11/1974 |

(Continued)

*Primary Examiner* — Jeffrey Allen
(74) *Attorney, Agent, or Firm* — Volpe and Koenig, P.C.

(57) ABSTRACT

A gas cylinder (100) in the neck (20) of which is installed a balanced valve (26). The valve is fitted in the outlet of the cylinder and its output emerges into a recess (22) which opens to the top surface (23) of the cylinder. Thus the valve is protected from physical damage. A thread (27) in the bore enables the attachment of fittings such as a regulator or a filling device (not shown) which cooperate with the valve (26) to control passage of gas from or into the cylinder.

17 Claims, 7 Drawing Sheets

(56) References Cited

U.S. PATENT DOCUMENTS

2003/0075700 A1   4/2003   Girouard et al.
2003/0234537 A1*  12/2003  Malone .................. 285/308
2004/0144803 A1   7/2004   Baker

FOREIGN PATENT DOCUMENTS

| | | |
|---|---|---|
| JP | 45600 U | 1/1992 |
| JP | 731607 U | 6/1995 |
| WO | 2004051388 A2 | 6/2004 |

* cited by examiner

PRESSURIZED FLUID CYLINDERS

FIELD OF INVENTION

The present invention relates to pressurised fluid cylinders.

BACKGROUND

In the employment of cylinders for the storage of high pressure fluids, particularly gasses, it is common practice to furnish the neck of the cylinder with a female thread into which some form of dispensing valve is fitted. This valve then holds the high-pressure gas charge within the cylinder and enables it to be dispensed when required by manipulating a handle or similar. By the nature of their function, such dispensing valves must be robust, in order to safely contain the high pressure within the cylinder. Robustness is also of particular importance to ensure that the cylinder, with its fitted valve, can withstand the physical abuse which inevitably occurs during handling, particularly during transport and refilling operations. Should the valve be subject to excessive mishandling so that it is sheared off or broken away from the cylinder, then a sudden release of high-pressure stored gas can result, with all of the attendant dangers—for example the cylinder can become a high velocity projectile propelled by the escaping gas.

These dangers have become more acute with the recent use of modern wrapping materials, such as carbon fibre filaments, to manufacture high pressure gas cylinders from light materials such as aluminium. As a result of these developments, the situation has arisen whereby the 'top hamper' (which is understood to include the gas control devices fitted to the cylinder including dispensing valves, any regulator fitted, together with any conserving devices), can be heavier than the cylinder itself, even when the cylinder is filled with gas.

In addition, the size of the top hamper can be considerable, sometimes even comparable to that of the cylinder itself, in the case of the smaller-sized cylinders, and this renders the cylinders vulnerable to damage during handling, storage and transport. For example, many designs of dispensing valve are so tall that they protrude to a sometimes considerable extent above the neck of the cylinder itself, and are thus particularly vulnerable to damage. One way of overcoming this problem is to provide that, should the top part of the valve be broken away, a self closing stop valve will operate to retain the pressurised gas within the cylinder. One example of such an arrangement is described in U.S. Pat. No. 4,077,422 which discloses a fail-safe shut-off device. In this device a valve spool is maintained in a balanced state by means of the pressure in a liquid situated in a chamber extending above the neck of the cylinder against the pressure provided by the combined effect of the compressed gas stored within the cylinder and a coil spring. A narrowed area provides a zone of weakness at which shearing off of the dispensing valve preferentially occurs in the event of an incident and, upon fracture at this point, pressure in the liquid is lost, and the valve spool moves onto a valve seat to thereby close off the cylinder. A particular disadvantage of this arrangement is that the weakened zone can in itself be a hazard because it makes the top hamper more likely to break off in the event of mistreatment such as if the cylinder is dropped or the top part hit.

Another example is described in U.S. Pat. No. 6,230,737 which uses a check valve which is permanently screwed into the threaded mouth of the cylinder and on which a dispensing valve may be mounted. The dispensing valve incorporates a stem which acts on the check valve to keep it open while the dispensing valve is in place. The lower profile of the cylinder when not fitted with the dispensing valve does reduce the opportunity for damage or breakage, but even the check valve itself extends significantly above the cylinder neck and therefore remains vulnerable.

Similar arrangements of dispensing valve and stop valve are to be found in other patents such as U.S. Pat. No. 5,144,973, U.S. Pat. No. 5,894,859, U.S. Pat. No. 3,930,517 and U.S. Pat. No. 4,907,617.

In the present invention the stop valve is replaced by a balanced valve such as described in GB-A-2298026 and WO 2004/051388. Such valves, whilst capable of acting as a stop valve for the potentially high pressures within the cylinder, require a relatively low actuating force so that they can be used directly with an associated reaction piston or diaphragm within a regulator mounted on the cylinder. Such an arrangement is more versatile than prior art arrangements, enabling a variety of different fittings, such as dispensing valves, regulators or filling devices, to be assembled to the cylinder secure in the knowledge that, should the fitting be dislodged or damaged, the balanced valve will close to secure the cylinder.

In addition, when used as a regulator valve, in conjunction with a regulator actuator, the balanced valve is found to be more tolerant of the large differences in pressure ratio across the valve which occur as between a cylinder which is fully pressurised with fluid and one which is nearly empty. With a non-balanced valve, the regulated pressure tends to drop off to an unusable level long before the cylinder is actually empty so the full fill of gas is, in effect, not available. Even before this, there is also a small, but noticeable fall off in regulated pressure as the cylinder empties.

Furthermore, when used in conjunction with a regulator, a balanced valve gives the advantage that it will intrinsically allow the fluid in the cylinder to be substantially completely discharged. Commercially available regulators which do not use a balanced valve are unable to completely empty the cylinder and flow will cease when the pressure in the cylinder falls to about 100 psi. There are times when it can be desirable to completely discharge the cylinder. In diving cylinders, for example, there may be situations where the full volume of the fluid in the cylinder may need to be made available.

Figure 1:
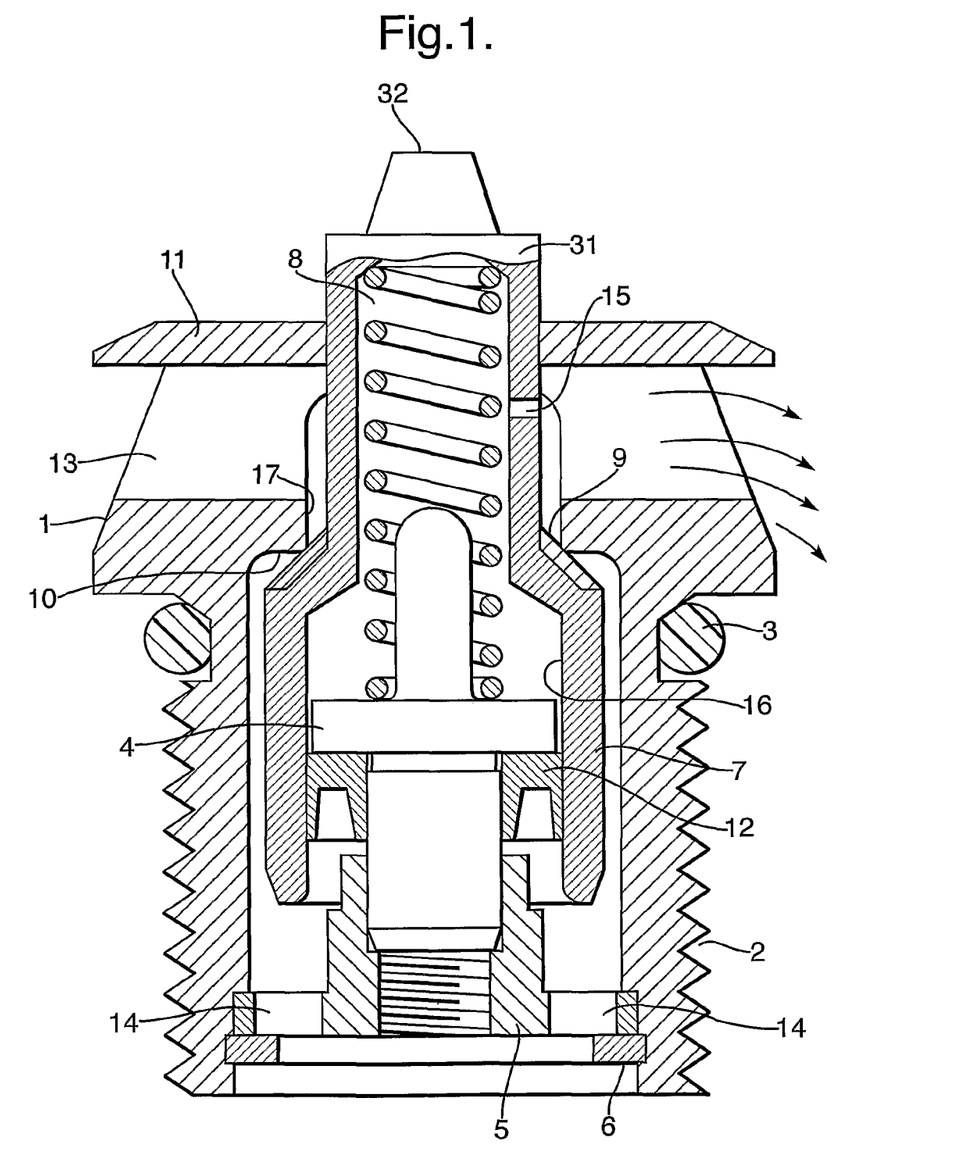
FIG. 1 is a cross sectional view of a known balanced valve suitable for use in the cylinder of the invention.

FIG. 1 of the accompanying drawings shows one version of the balanced valve described in GB-A-2298026 and WO 2004/051388. The valve comprises a hollow cylindrical body 1 having an external threaded section 2 and an O-ring 3 for sealing purposes Mounted within the hollow interior of the body 1 is a piston 4 which is attached to a support member 5 fitted in a recess at the lower end of the body 1 and secured in place by a circlip 6. Slidably mounted over the piston 4 is a valve member or poppet 7. An annular seal 12 seals the underside of piston 4 against valve member 7. A spring 8 acting between the piston 4 and the closed-off upper end of the valve member 7 acts to urge the valve member 7 in an upwards direction relative to the valve body 1. The valve member 7 is formed with a narrow upper portion and a wider lower portion, between which is a conical section carrying a layer 9 of resilient sealing material. The action of the spring 8 is such as to urge this sealing layer 9 against the edge of an annular shoulder 10 formed in the interior of the body 1.

The upper part of the body 1 is formed as a shroud 11 which defines an upper chamber 13 from which gas emerges transversely, as indicated. In use, high pressure gas enters the valve from beneath, via inlet passageways 14 through the support member 5, thence passes through the interior of the valve body 1 round the exterior of the valve member 7, via the valve seat 9/10, if open, and into the chamber 13 on the low pressure side of the valve. Apertures 15 in the upper part of the valve member 7 provide communication between the chamber 13 and the interior of the valve member 7 above the piston 4, so that the upper side of piston 4 is exposed to the low pressure side of the valve.

In the arrangement shown, the diameter 16 of the lower (wider) part of the valve member 7 is substantially equal to the inner diameter 17 of the valve seat 9/10 so that, when the valve is in the closed position (as shown), the gas pressure on the low pressure side of the valve produces no net force on the valve member 7 and likewise, neglecting the finite width of the valve seat, the gas pressure on the high pressure side of the valve produces no net force on the valve member 7. The valve is thus balanced. Further detail concerning the construction and operation of the valve can be obtained from the aforementioned patents.

As well as the balanced action, a further advantage of a valve of this type is that it provides a valve seat which allows a substantially greater gas flow rate than is practicable with non-balanced valves. In addition the valve does not extend into the storage volume of the cylinder at all and thus does not use up valuable storage capacity. This contrasts with many prior art valve arrangements, such as typified by that described in U.S. Pat. No. 5,894,859 in which a useful proportion of the storage capacity is occupied by the valve, and its associated equipment. This problem is particularly acute with smaller sized cylinders that can range in capacity from 150 liters down to as little as 0.6 liters or less.

Furthermore, the relatively small size and the manner of fitting of this type of valve allows for a squatter top hamper which is less vulnerable to damage.

SUMMARY

According to the present invention there is provided a pressurised fluid cylinder having a neck incorporating an outlet for the stored fluid, said outlet incorporating a bore in which is fitted a balanced valve operable to prevent the contents of the cylinder from escaping.

Preferably the balanced valve is of the type described in GB-A-2298026 and WO 2004/051388. Stated broadly, this valve comprises a valve housing providing a chamber accommodating at least part of a valve member, said chamber forming at least part of a first or high pressure side of said valve, a passage leading from said chamber to a second or low-pressure side of said valve, a valve seat in said passage, said valve member having a seating surface co-operating with the valve seat and the valve member being displaceable, respectively (a) in a first direction, to move said seating surface into said chamber and away from said valve seat to open the valve and (b) in a second, opposite direction, to move said seating surface towards said valve seat to close the valve, and biasing means biasing said valve member in said second direction. In an embodiment, the valve housing affords, on the low pressure side of the valve, a shroud extending transversely with respect to the valve axis and spaced from said passage so as to deflect any gas proceeding from said passage, the valve housing defining with said shroud one or more transverse passages leading to one or more openings at the sides of the valve housing, for the passage of gas issuing from said passage. Preferably, said shroud has a central aperture through which extends, as a sliding fit, a central axial extension of said valve member, whereby the valve member is reliably guided for axial movement. This extension thus protrudes above the shroud and thus provides an externally actuable member which can be operated to open the valve when the contents of the cylinder are to be dispensed, or the cylinder filled.

The bore in which the balanced valve is fitted may be formed directly in the cylinder. Alternatively, the bore may be formed in an adaptor which is itself fitted directly in the cylinder outlet. Whichever method is used, the intention is that the balanced valve, and adaptor if used, is semi-permanently fitted in the cylinder outlet and thus provides a cylinder which is secured against leakage during handling, storage and transportation and has the minimum top hamper necessary for these activities. It will be seen that it is not necessary to fit external valves, regulators or other unwieldy and heavy fittings during many of the activities associated with the cylinder because the balanced valve alone will keep the contents of the cylinder secure. The fittings need only be installed when needed and even then, as will be explained, the arrangement of the invention allows a "fail-safe" function should an accident occur. When fittings are in use, the balanced valve, with its capability of large fluid flow (see above) does not interfere with the normal activities related to the emptying or filling of the cylinder.

It is preferred that the balanced valve (and adaptor if fitted) is positioned within the outlet in such a way that it does not protrude above the normal neck of the cylinder. This helps to keep the centre of gravity of the cylinder as low as possible and at the same time reduces the possibility of damage which is present when items protrude significantly above the cylinder. Although applicable to all cylinders, this is particularly important when the cylinder itself is made of a lightweight material, and so can easily become top heavy if items protrude above the main body of the cylinder itself.

In practice, particularly if an adaptor is used, it is desirable, from a fitting point of view, to define a small shoulder on the adaptor which can butt up to the exterior of the cylinder outlet to thus define a fixed position, particularly if a screwed connection is used. Such a shoulder can be defined by a flange which will protrude to a small extent above the mouth of the cylinder, but not sufficient to significantly affect the balance of the cylinder, or its liability to damage.

In a preferred construction, the bore in which the balanced valve is fitted is stepped to define a wide portion at its outer end, and a relatively narrower portion at its inner end. The wide portion thus effectively defines a recess extending inwards from the mouth of the bore. The balanced valve is fitted in the narrower portion of the bore, for example by means of a threaded connection, and may extend into the wider portion, or recess, but not to the extent that it protrudes above the top of the cylinder. The balanced valve is thus well out of danger of being damaged during such activities as transportation and storage when, it will be recalled, the intention is to remove all fittings which might become damaged and/or lead to the cylinder becoming top heavy, thus potentially leaving the balanced valve itself vulnerable to damage.

The recess, as well as protecting the balanced valve, also provides convenient surfaces for mounting fittings such as a dispensing valve, regulator or filling device. For this purpose the wall or walls of the recess may be provided with means for securing a fitting. Such securing means may comprise a female screw thread, for cooperation with a corresponding male thread on the fitting, or some form of quick release fitting. Preferably also the recess may define a smooth surface against which a seal, such as an O-ring seal, may bear in order to seal the connection between the cylinder outlet and any installed fitting.

In an embodiment of the invention, means are provided for relieving over-pressure in the cylinder. Such over-pressure means bypasses the balanced valve, and comprises some form of pressure release device. This device may include a burst disc that breaks at some level of excess pressure, a fusible element that melts at an elevated temperature or some combination of the two. The vent passage is usually of narrow bore so as to prevent excessive ejection of fluid from the cylinder.

The burst disc is generally mounted in a housing from which leads a passage, the housing and the passage together leading from a position upstream of the balanced valve to a position downstream of the balanced valve, so as to bypass the balanced valve in the event of an over-pressure. In practice the downstream connection is often formed simply as a vent to atmosphere or, if a recess is provided, the downstream connection may open into the recess. The housing and passage may be machined out of the body of the cylinder itself or, if an adaptor is used, out of the body of the adaptor or part out of the cylinder and part out of the adaptor. The burst disc housing is usually located at one end or the other of the passage, as dictated by the circumstances.

The invention can be employed in any pressurised fluid cylinder that is capable of having its output modified to enable a balanced valve to be fitted. It is possible that the invention can be applied to low pressure cylinders, but the present intention is to use the invention on higher pressure cylinders that operate at a maximum pressure in the range 500 psi to 5000 psi, or greater.

BRIEF DESCRIPTION OF THE DRAWINGS

In order that the invention may be better understood, several embodiments thereof will now be described by way of example only and with reference to the accompanying drawings in which.

DETAILED DESCRIPTION OF THE PREFERRED EMBODIMENTS

Figure 2:
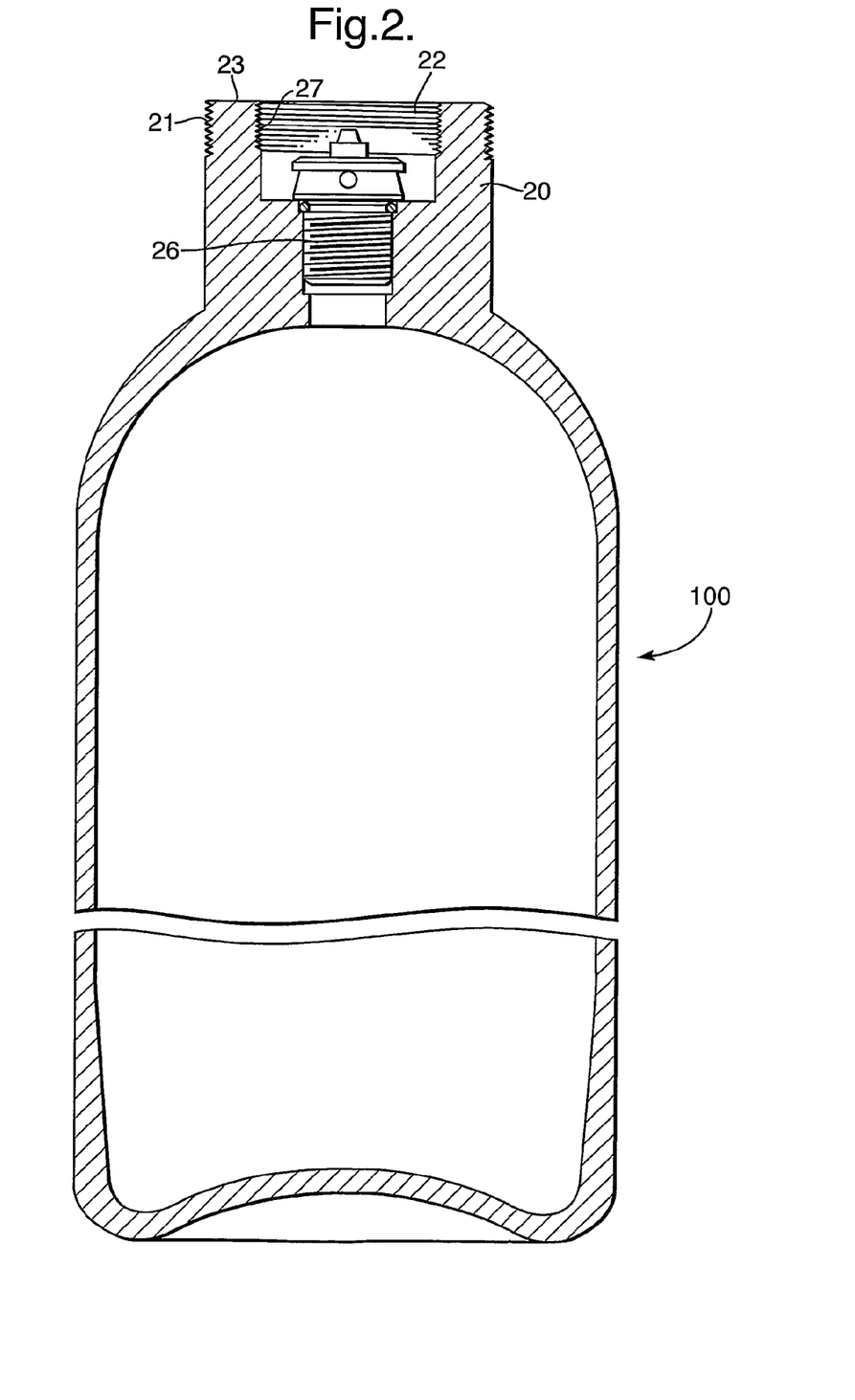
FIG. 2 is a cross sectional view of a pressurised fluid cylinder modified in accordance with a first embodiment of the invention.
Figure 3:
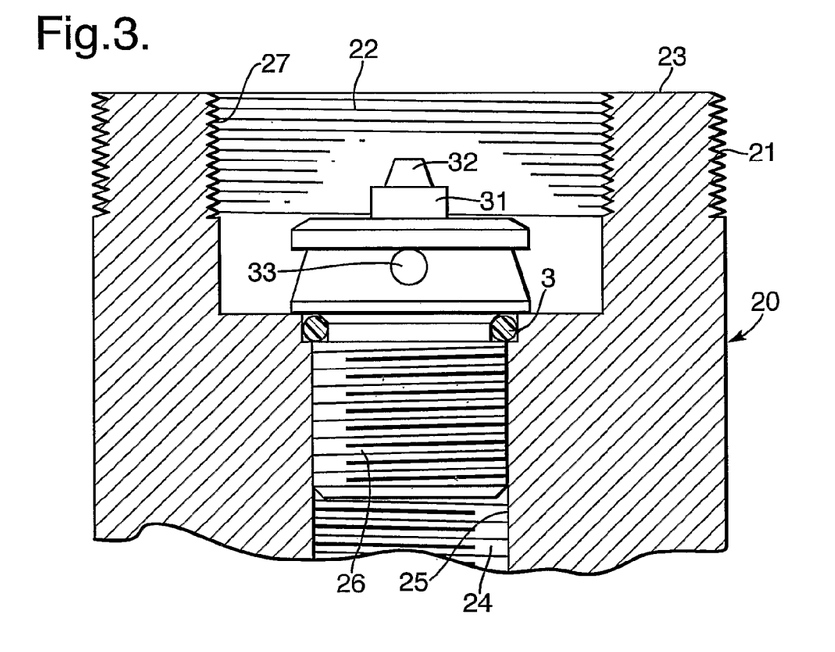
FIG. 3 shows the neck portion of the cylinder of FIG. 2 in enlarged detail.

Referring to FIG. 2, there is shown a typical compressed gas cylinder 100 having a narrowed neck portion 20 in which is fitted a balanced valve 26, of the type shown in FIG. 1. In its normal state, the balanced valve is in the closed condition, thus safely retaining the pressurised contents of the cylinder. FIG. 3 illustrates the upper part of the neck portion 20 on a larger scale. It can be seen that, with the cylinder standing upright, the neck portion is circular in horizontal section and has an external thread 21 for attachment of external fittings (not shown).

The gas outlet port of the cylinder 100 is formed as a stepped bore, creating a wider upper part in the form of a recess 22 opening out onto the top surface 23 of the neck of the cylinder, and a narrower inner part 24. The inner part 24 is fitted with the balanced valve 26 by cooperation between the external thread 2 of the balanced valve with an internal thread 25 formed on the inner part 24. Sealing is effected by the O-ring 3 acting in a small annular recess formed at the mouth of the inner part 24 as it enters the recess 22.

The vertical wall of recess 22 is formed with an internal thread 27 for attachment of fittings (not shown) such as a dispensing valve, regulator or filling device; however other attachment means could be provided by the recess, such as quick-fit attachments. In order to protect the interior of the recess, particularly during transportation, a plug (not shown) may be used to cap off the open end of the recess. Such a plug may utilise the internal thread 27 to enable it to be attached.

Figure 4:
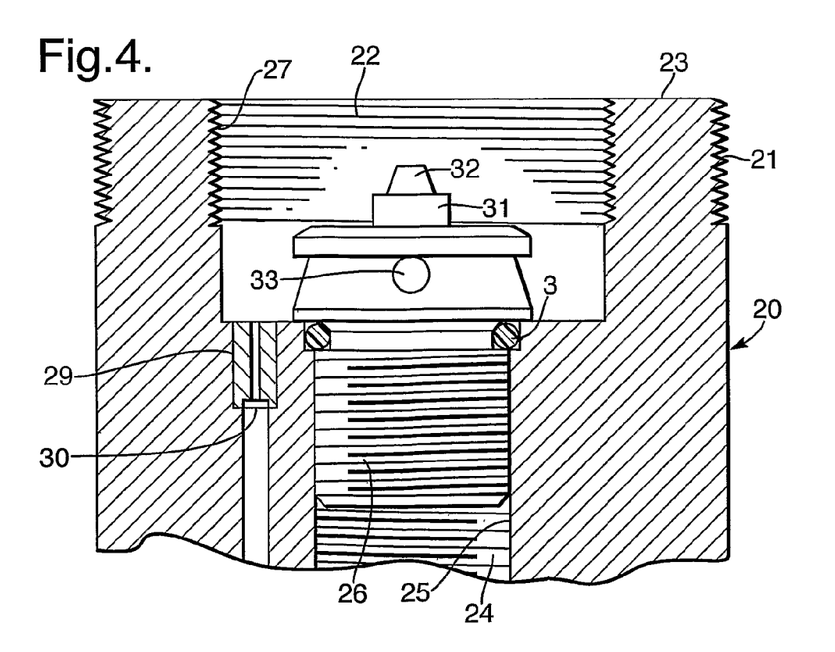
FIG. 4 is a variant on the embodiment of FIG. 2/3, showing a cylinder over-pressure arrangement.

FIG. 4 illustrates an arrangement similar to that of FIG. 3, but in which an over-pressure device is fitted in order to protect against excess pressure within the cylinder. The over-pressure device comprises a passage 28 formed in the neck 20 and which is connected at a point (not shown) upstream of the balanced valve 26 so as to be exposed to the high pressure within the cylinder. The passage 28 leads past the valve 26, thus bypassing same, and ends in a housing 29 which contains a frangible element 30. The housing 29 opens into the recess 22. The arrangement is such that the frangible element normally seals off the end of the passage 28 and the bypass thus has no effect. In the event of a predetermined over-pressure within the cylinder, however, the frangible element fractures and the excess pressure is relieved, via the passage 28 and housing 29, into the recess 22. The housing may alternatively or in addition contain a fusible element which exhibits the same action, but in the event of excess temperature being detected.

As is made clear in FIG. 1, the balanced valve is normally in the closed condition, due to the action of the spring 8 biasing the valve member 7 in a direction such as to cause the resilient layer 9 to bear against the valve seat formed by the edge of shoulder 10. Thus, when the valve is fitted in the manner illustrated in FIGS. 3 and 4, the narrow part 24 of the cylinder outlet is sealed, and the pressurised contents of the cylinder are safely retained. As already mentioned an extension of the valve member 7 extends above the shroud which effectively forms the top cover of valve 26 and this is shown under reference 31 in FIGS. 3 and 4. This extension terminates in a conical protrusion 32 which in fact acts as a valve member in conjunction with various fittings, as will be explained.

It will be seen that downwards thrust on the protrusion 32 will cause the valve member 7 to move against the thrust of spring 8 to open the valve. The circumstances under which this happens will be explained below but, when it does, gas in the low pressure chamber 13 of the balanced valve 26 will emerge from a plurality of spaced side orifices 33 into the recess 22. Under normal circumstances, opening of the valve 26 in this way will only occur when a fitting is attached, and any low-pressure gas entering the recess from the valve will be directed into the fitting, as will be explained below.

Figure 5:
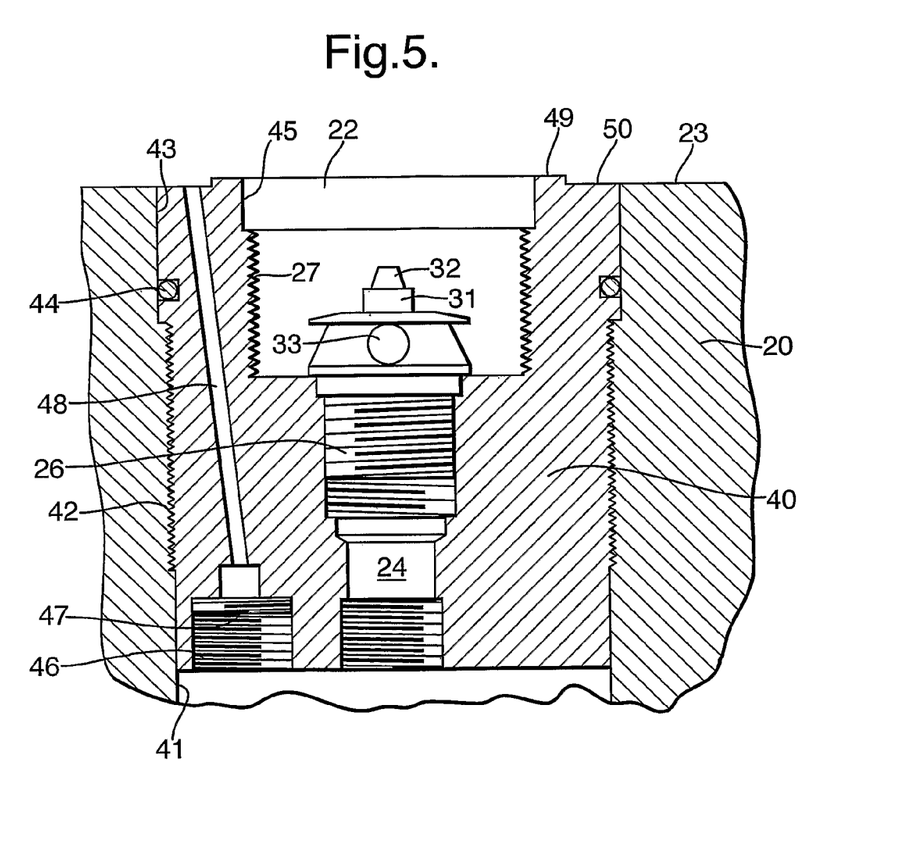
FIG. 5 is a cross sectional view of the upper part of a compressed fluid cylinder, showing the modifications according to a further embodiment of the invention.

FIGS. 3 and 4 illustrate the fitting of the balanced valve 26 into a threaded bore that is formed directly into the cylinder 100 itself. It is sometimes desirable for various reasons to provide an adaptor between the balanced valve and the cylinder and FIG. 5 shows an example of such an arrangement. In this case the stepped bore is formed in an adaptor 40, made for example of brass or stainless steel, and the adaptor 40 is then screwed into the outlet of the cylinder 100. To this end, the upper part 20 of the neck of the cylinder is formed with a circular bore 41 having an internal thread which engages at 42 with a corresponding external thread on the outside surface of the adaptor 40. The outer part 43 of the bore 41 is smooth so as to provide an accurate fit with the adaptor outer surface, and also to provide a surface to engage an O-ring seal 44 located in an annular slot formed in the adaptor outer surface.

The stepped port bore for the balanced valve is formed in the adaptor in the same way as described above with reference to FIGS. 3 and 4, and the same reference numerals are used to denote the equivalent parts. A small difference is that the outer end of the recess 22 is formed as a smooth wall 45, instead of the thread 27 extending all the way to the mouth of the recess as previously, in order to provide an accurate location and sealing surface for a fitting (not shown).

The adaptor 40 provides a convenient component in which to machine other features, such as the over-pressure device illustrated. This is similar to that described in FIG. 4, except that it is the other way round—in other words the housing 46 containing the pressure release device 47 is connected in parallel with the balanced valve. It may be physically below the balanced valve, as shown in FIG. 5, or physically above it and accessible from the outside of the cylinder. The passage 48 leads from the cylinder to the top surface of the adaptor 40 where it vents to atmosphere. It will be noted that the upper surface of the adaptor is stepped, providing a rim 49 which is slightly higher than the remaining annular-shaped part 50 of the upper surface. The rim 49 defines an abutment surface for accurate securement of a fitting (not shown) and ensures that, even when the fitting is in place, a small space is left between its undersurface and the part 50 of the adaptor top surface so as to allow escape of gas in the event that the disc 47 is ruptured.

It will be noted that, although the abutment surface defined by the rim 49 extends slightly above the top surface 23 of the cylinder, the amount is very small, and not sufficient to significantly raise the centre of gravity of the cylinder, or act as a prominent protrusion above the cylinder top surface which might be vulnerable to damage.

Figure 6:
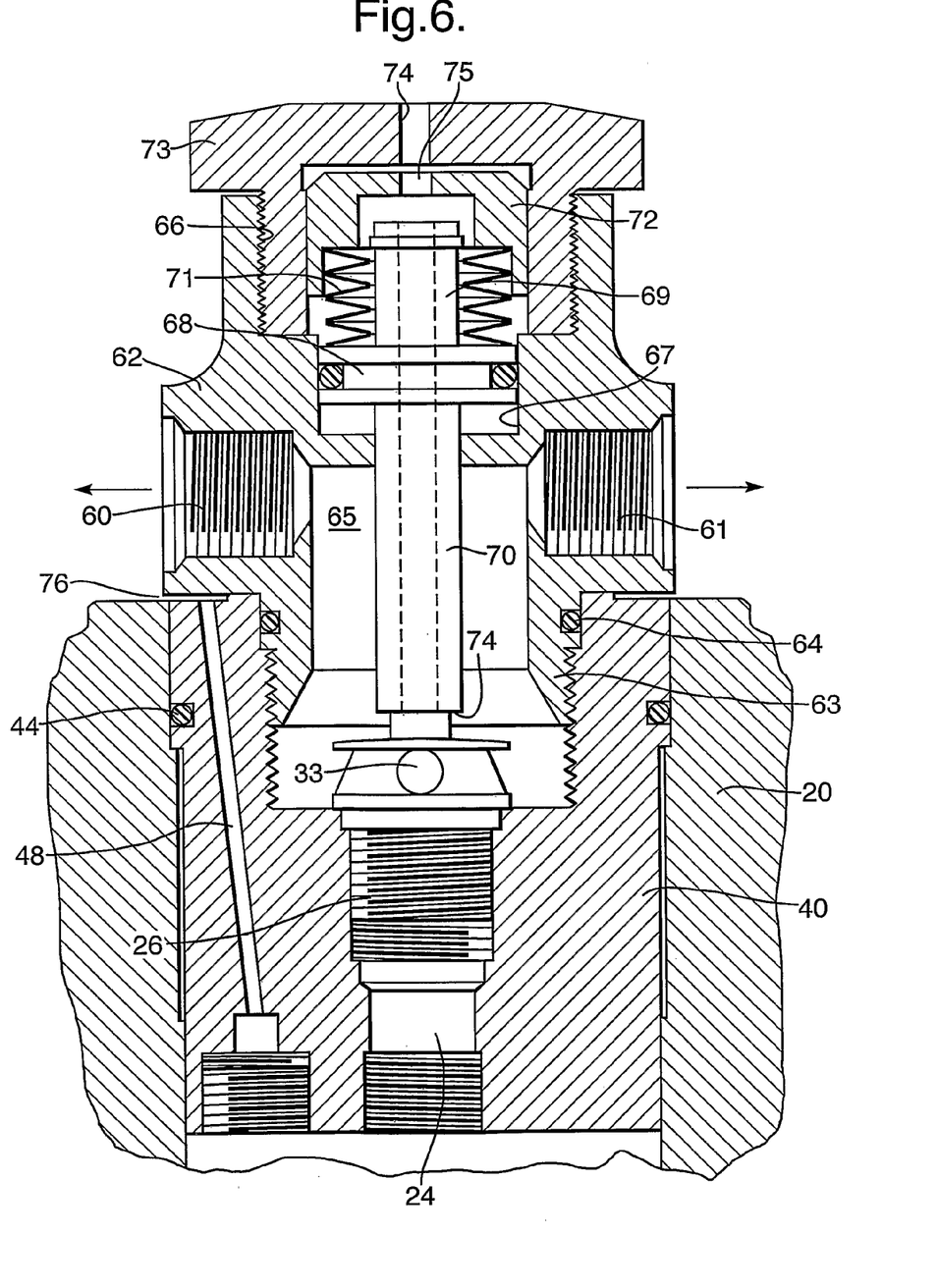
FIG. 6 is a cross sectional view of the FIG. 5 embodiment, fitted with a regulator.
Figure 7:
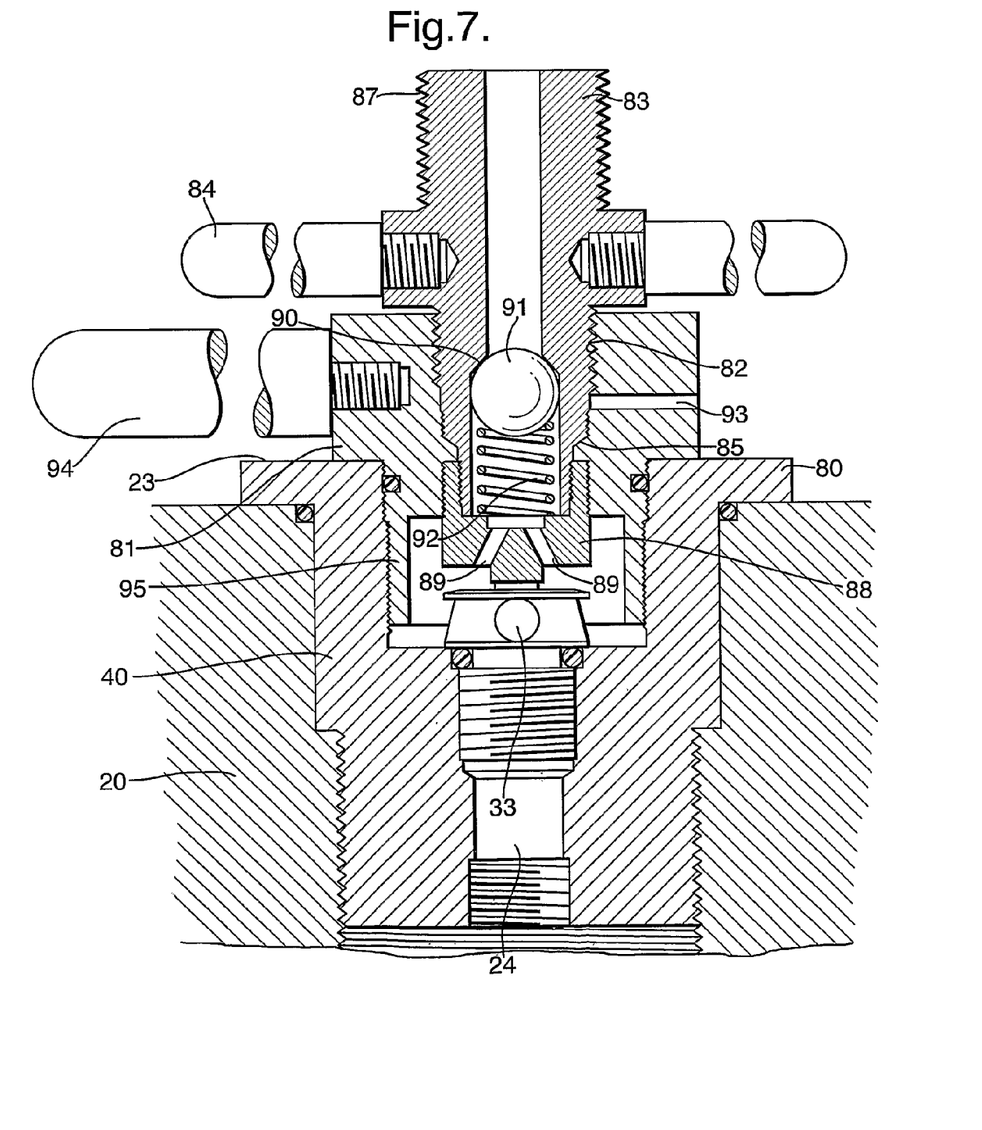
FIGS. 7 and 8 are cross sectional views of still further embodiments of the invention, fitted with a filler device.

FIGS. 6 and 7 illustrate the use of typical fittings in conjunction with the cylinder of the invention.

Referring firstly to FIG. 6, there is shown a regulator actuator fitted to a cylinder of the type illustrated in FIG. 5, and incorporating a balanced valve 26 mounted in an adaptor 40 in the neck part 20 of the cylinder. As will be explained, the regulator actuator acts on the balanced valve 26 so that the combination of the two constitutes a regulator providing a regulated low pressure output to output ports 60, 61.

The regulator actuator comprises a main body 62 having an externally threaded spigot 63 by which it is attached to the internal thread 27 of the recess 22, and hence to the cylinder 100. When screwed fully in, the underside of the main body 62 bears against the rim 49 of the adaptor (see FIG. 5), thus defining a relief gap 76 to receive the output from the excess-pressure release device 46/48, as described above. An O-ring 64 acts against surface 45 to seal the joint between the main body 62 of the regulator actuator, and the adaptor 40. The aforesaid ports 60, 61 are formed in the main body 62 and are threaded to enable the attachment of further fittings and/or connection hoses. The ports 60, 61 are connected to a low pressure chamber 65 which is open at its lower end to the recess 22 and thus receives low pressure gas from the balanced valve 26.

The upper part of the main body 62 is formed with a stepped cylindrical bore having a wide upper portion 66 which is internally threaded, and a narrower portion 67. The narrower portion 67 forms a cylindrical chamber in communication with chamber 65 and in which a reaction member 68 in the form of a piston is sealingly slidable. The stem of the reaction member is hollow and extends both above (reference 69) and below (reference 70) the reaction member itself. The lower end 74 of the stem 70 engages the conical protrusion 32 of the valve member 7 of the balanced valve 26 in such a way as to normally close off the lower end of the hollow interior of the stem. For this purpose, a spring 71 acts between a pressure adjustor wheel 72, mounted within the wide portion 66 of the bore, and the top surface of the reaction member 68, thus biasing the reaction member 68 and hence the stem 70 in a downwards direction into engagement with the conical protrusion 32. This in turn lowers the valve member 7 of the balanced valve 26 (see FIG. 1), and opens the valve to allow pressurised gas from the cylinder to enter the chambers 65 and 67. The pressure in these chambers thus rises and the resultant thrust applied to the reaction member 68 in the upwards direction is counterbalanced by the downward-thrust due to the spring 71. Thus, as gas is removed from chamber 65 through the outlet ports 60, 61 a pressure is maintained therein which is dependent on the applied thrust of spring 71. This pressure can be adjusted by means of the pressure adjuster wheel 72 which can be rotated to move the wheel towards and away from the top of the reaction member so as to vary the thrust of the spring 71.

The spring 71 may, for example be a coil spring, but in the embodiment illustrated comprises a stack of individual pairs of conical spring washers. This construction of spring enables the required spring strength to be achieved in an overall shorter length, thus contributing to the desirable low profile of the fitting as a whole.

In order to vary the spring, thrust the adjuster wheel 72 is externally threaded and engages an internal thread formed in a recess formed in a valve knob 73 which is itself externally threaded to engage in the threaded wide portion 66 of the stepped bore in the main body 62. The operating position of the valve knob 73 is as shown—i.e. screwed fully inwards to engage the shoulder formed between the wide and narrow parts of the stepped bore. Rotating the knob anticlockwise raises the knob, and with it the pressure adjuster wheel 72 to thereby reduce the thrust of spring 71, thus raising the valve stem 69/70 and closing the balanced valve 26.

The knob 73 has a small central aperture 74 through which a tool may be inserted to engage a corresponding, and suitably shaped aperture 75 in the pressure adjusting wheel 72 whereby the wheel 72 may be rotated to adjust the output gas pressure.

As mentioned, in normal operation of the regulator, the lower end 74 of the stem 69/70 bears against the protrusion 32, thus sealing off the lower end of the hollow interior of the stem. However, in the event of a malfunction causing build up of pressure within the chamber 65, the reaction member 68 will be forced upwards in the bore 67 to such an extent that the lower end 74 of the stem will become separated from the protrusion 32, thus allowing the chamber 65 to vent to atmosphere via the hollow interior of the stem 69/70, and the apertures 74 and 75 in the wheel 72 and knob 73 respectively.

It will be noted that the regulator is of a reasonably squat construction reducing, as far possible, its effect on the top hamper of the cylinder. Lightweight materials may also be used wherever possible, bearing in mind that none of the regulator actuator is subject to high pressure and that even if damaged or dislodged, the system will fail safe since the valve member 7 of the valve 26 will close if the thrust on it from the stem 69/70 is released for any reason. To this end, the main body 62 of the regulator actuator, which accounts for the greatest portion of the bulk of the unit, may be made of lightweight material such as aluminium or even polymeric material, as well as the more conventional heavier materials such as brass, bronze or stainless steel.

FIG. 7 shows a filling device for enabling an empty cylinder to be filled with gas from an external source (not shown). The filling device is shown mounted on an alternative form of adaptor 40, but most details are the same as that illustrated in FIG. 5, and the same reference numerals are used where appropriate.

The main difference in the adaptor 40 is that a flange 80 is provided which extends beyond the outlet aperture of the cylinder 100 and, when fitted, bears against the top surface 23 of the cylinder. Although this means that the adaptor 40 does extend above the top of the cylinder, it does so only to a small extent not sufficient to significantly affect the top hamper of the cylinder, or provide a vulnerable protrusion.

The filling device comprises a main body 81 made, for example, of brass or stainless steel, having an externally threaded spigot 95 whereby it may be attached to the adaptor 40 of the cylinder 100 in the same manner as the spigot 63 in the embodiment of FIG. 6. The main body 81 is formed with a central bore, the upper part 82 of which is threaded to receive a hollow valve spindle 83, also for example of brass or stainless steel, the lower end of which is narrower, with a conical shoulder between the wider and narrower portions. The valve spindle 83 may be rotated by a pair of tommy bars or handles 84 extending outwards as shown. When the valve spindle is screwed fully inwards (i.e. downwards in the drawing) the conical shoulder engages a valve seat 85 in the form of a corresponding conical shoulder between the upper part 82 of the bore and a lower, narrower part 86. The top end of the valve spindle 83 is externally threaded at 87 to enable connection to an associated source of gas for filling the cylinder.

The lower end of the valve spindle 83 is fitted with a probe 88 which engages the protrusion 32 of the valve member 7 of the balanced valve 26. The probe 88 has apertures 89 whereby the hollow interior of the valve spindle 83 communicates with the chamber 22 within the adaptor 40, and hence with the apertures 33 in the balanced valve 26.

The hollow interior of the valve spindle has a conical shoulder 90 against which is biased a ball 91 by means of a spring 92 acting between the probe 88 and the ball. The shoulder 90 thus forms a valve seat which is closed by the ball so as to allow gas to pass downwards within the valve spindle, provided it is at sufficient pressure to overcome the force of spring 92, but not to allow flow in the reverse direction.

To use the device, the handles 84 are turned to rotate the valve spindle tight down onto the valve seat 85. As the valve spindle is lowered, the probe 88 pushes on the protrusion 32 thus moving the valve member 7 of the balanced valve 26 downwards (see FIG. 1) and opening the valve. Any pressure within the cylinder is contained due to the ball valve 90/91.

The gas source may now be connected to supply gas to the device to fill the cylinder. Pressurised gas from the gas source enters at the top of the valve spindle, travels down its hollow interior past the ball valve 90/91, through the apertures 89, into chamber 22, and enters the balanced valve 26 through its outlet apertures 33. The gas then continues to flow through the open valve 26 to fill the cylinder 100.

When the cylinder is full, the gas source is closed and disconnected and the handles 84 used to unscrew the valve spindle 83 to open the valve seat. This closes the balanced valve 26, due to the probe 88 being raised, and at the same time allows residual pressure within the chamber 22 and adjacent areas to vent to atmosphere slowly and safely via a bleed port 93. Finally a tommy bar or handle 94 may be used to rotate the main body 81 to allow it to be removed from the cylinder, once the residual gas has been safely exhausted.

Figure 8:
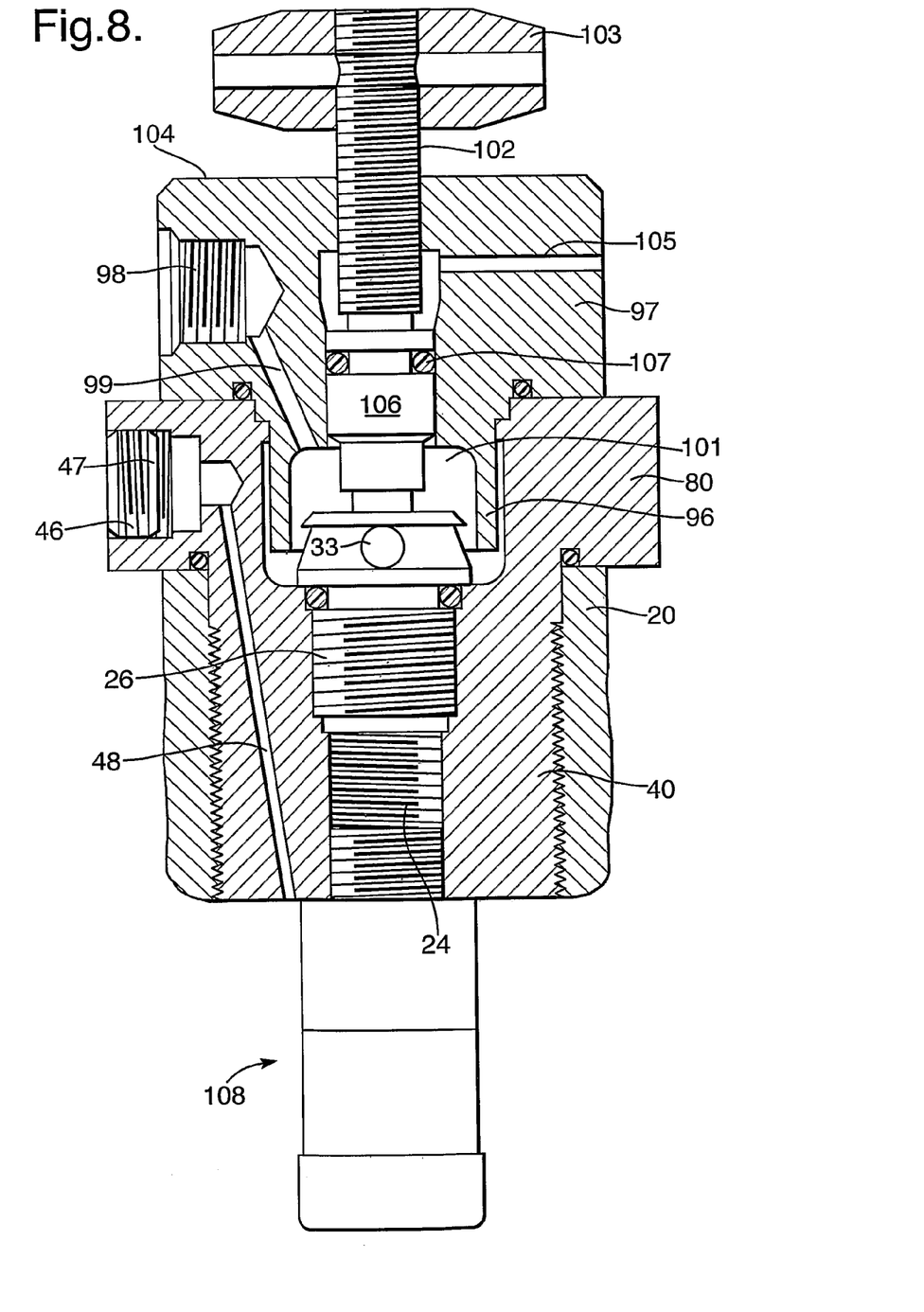

FIG. 8 shows a further embodiment of a filling device for enabling an empty cylinder to be filled with gas. FIG. 8 also shows a still further form of adaptor 40 which is similar to that of FIG. 7, but in which the flange 80 extends further above the cylinder top surface 23 in order to accommodate a housing 46 for a pressure relief device 47. This device is similar to that of FIG. 5, described above but, in this case, the restricted space within the neck portion 20 of the cylinder means that the housing is placed at the exterior end of the passage 48.

Although the adaptor 40 does extend above the top of the cylinder to a greater extent than in previous embodiments, it is still not sufficient to materially affect the top hamper of the cylinder, or its vulnerability to damage.

The filling device comprises a main body 97 made, for example, of brass or stainless steel, having an externally threaded spigot 96 whereby it may be attached to the adaptor 40 of the cylinder 100 in the same manner as the spigot 63 in the embodiment of FIG. 5. The main body is formed with a threaded input port 98 by which an external source of gas (not shown) may be connected. A passage 99 leads from the input port 98 to a chamber 101 formed in the spigot 96 which communicates with the recess 22 in the adaptor 40.

The main body 97 is formed with a central bore which, at its lower end, opens into the chamber 101. The upper end of the central bore is internally threaded to receive the externally threaded spindle 102 of an actuator knob 103. Beneath the threaded portion of the central bore is an enlarged chamber 104 from which extends to the exterior a vent passage 105. Between the chambers 101 and 104, the central bore forms a cylindrical surface for a piston 106 having a sealing ring 107. The lower end of piston 106 engages with the protrusion 32 of the balanced valve 26 whilst its upper end engages with the spindle 102.

A filter unit 108 is fitted to the inner end of the inner part 24 to filter gas entering or leaving the cylinder 100.

To use the device the main body 97 is screwed tightly into the neck of the cylinder 100, as shown. The external source of gas is next connected to the port 98. The knob 103 is now rotated to lower its spindle 102 and hence the piston 106 which in turn lowers the valve member 7 of the balanced valve 26 (see FIG. 1), thus opening the valve. The gas source is now opened and gas enters via the input port 98, and flows through passage 99, chamber 101, and into the outlet apertures 33 of the balanced valve 26. The gas then continues to flow through the open valve 26 to fill the cylinder 100.

When the cylinder is full, the gas source is closed, and the knob 103 is unscrewed to raise the piston 106 to in turn raise the valve member 7 to close the balanced valve 26. As the spindle 102 is raised, the upper part of the piston 106 enters the wider chamber 104 and breaks the seal 107, thus allowing residual pressure in the chamber 101 and adjacent areas to vent to atmosphere slowly and safely via the exterior of the piston 106 and the passage 105. Once the residual gas is fully exhausted, the filling device can be removed and the gas source disconnected.

The invention claimed is:

1. A pressurised fluid cylinder having a neck incorporating an outlet for fluid stored therein, said outlet incorporating a bore in which is fitted a balanced valve, the valve thereby being fitted in the neck of the cylinder such that it does not protrude or minimally protrudes above the neck, and wherein:
the neck is adapted to receive a detachable valve actuator that includes a reaction member,
the valve is operable by means of the detachable valve actuator, in which:
attachment of the actuator brings the reaction member into direct contact with a valve member within the balanced valve, moving it in a direction to open the valve and to allow fluid flow through said valve; and
detachment of the actuator removes the contact between the reaction member and the valve member, thereby allowing the valve member to revert to a position at which the valve member seals the valve thereby preventing the contents of the cylinder from escaping.

2. A pressurised fluid cylinder as claimed in claim 1 wherein said bore is formed directly in said cylinder.

3. A pressurised fluid cylinder as claimed in claim 1 wherein said bore is formed in an adaptor which is fitted in the outlet of the cylinder.

4. A pressurised fluid cylinder as claimed in claim 3 wherein said adaptor has an external flange which, when fitted bears against an upper surface of the neck to thereby locate the adaptor with respect to the cylinder.

5. A pressurised fluid cylinder as claimed in claim 3 wherein the adaptor is fitted with an excess pressure device operable to vent excess pressure within the cylinder.

6. A pressurised fluid cylinder as claimed in claim 5 wherein an exterior rim of the bore has an upstanding rim, and wherein said excess pressure device has a vent outlet located in an outer surface of the adaptor in an area beyond the rim such that, when a fitting is attached to the cylinder said area defines a relief aperture to enable excess pressure to be relieved.

7. A pressurised fluid cylinder as claimed in claim 1 wherein said bore is a stepped bore having a wider portion at its outer end and a narrower portion at its inner end, and wherein said balanced valve is fitted in said narrower portion.

8. A pressurised fluid cylinder as claimed in claim 7 wherein said balanced valve is wholly located within said bore.

9. A pressurised fluid cylinder having a neck incorporating an outlet for fluid stored therein, said outlet incorporating a stepped bore with a wider portion at its outer end and, at its inner end, a narrower portion in which is fitted a balanced valve, the valve thereby being fitted in the neck of the cylinder such that it does not protrude or minimally protrudes above the neck, the valve comprising:
- a valve housing providing a chamber accommodating at least part of a valve member, said chamber forming at least part of a first or high pressure side of said valve, a passage leading from said chamber to a second or low-pressure side of said valve, a valve seat in said passage, said valve member having a seating surface co-operating with the valve seat and the valve member being displaceable, respectively (a) in a first direction, to move said seating surface into said chamber and away from said valve seat to open the valve and (b) in a second, opposite direction, to move said seating surface towards said valve seat to close the valve, and biasing means biasing said valve member in said second direction, and wherein the valve housing affords, on the low pressure side of the valve, a shroud extending transversely with respect to the valve axis and spaced from said passage so as to deflect any gas proceeding from said passage, the valve housing defining with said shroud one or more transverse passages leading to one or more openings at the sides of the valve housing, for the passage of gas issuing from said passage; and wherein
- the neck is adapted to receive a detachable valve actuator that includes a reaction member, the valve is operable by means of the detachable valve actuator, in which:
  - attachment of the actuator brings the reaction member into direct contact with a valve member within the balanced valve, moving it in a direction to open the valve and to allow fluid flow through said valve; and
  - detachment of the actuator removes the contact between the reaction member and the valve member, thereby allowing the valve member to revert to a position at which the valve member seals the valve thereby preventing the contents of the cylinder from escaping.

10. A pressurised fluid cylinder as claimed in claim 9 wherein said valve housing protrudes into the wide portion of said bore to an extent to enable said openings to open into said wide portion.

11. A pressurised fluid cylinder as claimed claim 9 wherein said shroud has a central aperture through which extends, as a sliding fit, a central axial extension of said valve member, whereby the valve member is reliably guided for axial movement.

12. A pressurised fluid cylinder as claimed in claim 7 wherein the wide portion of said stepped bore incorporates means for attaching a fitting to the cylinder.

13. A pressurised fluid cylinder as claimed in claim 12 wherein said attaching means comprises an internal screw thread formed on the wall of the wide portion of the bore.

14. A pressurised fluid cylinder as claimed in claim 12 wherein said attaching means comprises a quick fit connector.

15. A pressurised fluid cylinder assembly comprising a pressurised fluid cylinder as claimed in claim 12 to which is attached a fitting, said fitting having an attachment means which cooperates with the attaching means in the wide portion of said stepped bore.

16. A pressurised fluid cylinder assembly as claimed in claim 15 wherein said fitting comprises a regulator actuator having a spring loaded reaction member, means for mechanically connecting said reaction member to said balanced valve to actuate same in such a way that the output pressure supplied by said balanced valve is regulated at a pressure set by the thrust applied by said spring.

17. A pressurised fluid cylinder having a neck incorporating an outlet for fluid stored therein, said outlet incorporating a bore in which is fitted a balanced valve that includes a valve member, the valve thereby being fitted in the neck of the cylinder such that it does not protrude or minimally protrudes above the neck, and wherein the valve is balanced such that, irrespective of fluid pressure within the cylinder, fluid pressure on both a low pressure side and a high pressure side of the valve, when closed, produces approximately no net force on the valve member, the neck is adapted to receive a detachable valve actuator that includes a reaction member, the valve is operable by means of the detachable valve actuator, in which:
- attachment of the actuator brings the reaction member into direct contact with a valve member within the balanced valve, moving it in a direction to open the valve and to allow fluid flow through said valve; and
- detachment of the actuator removes the contact between the reaction member and the valve member, thereby allowing the valve member to revert to a position at which it seals the valve thereby preventing the contents of the cylinder from escaping.

* * * * *